United States Patent [19]

Hansma et al.

[11] Patent Number: 4,800,274

[45] Date of Patent: Jan. 24, 1989

[54] HIGH RESOLUTION ATOMIC FORCE MICROSCOPE

[75] Inventors: Paul K. Hansma; Richard Sonnenfeld, both of Goleta, Calif.

[73] Assignee: The Regents of the University of California, Berkeley, Calif.

[21] Appl. No.: 9,682

[22] Filed: Feb. 2, 1987

[51] Int. Cl.⁴ .......................................... G01N 23/00
[52] U.S. Cl. ................................ 250/306; 250/423 F
[58] Field of Search ..................... 250/306, 307, 423 F

[56] References Cited

U.S. PATENT DOCUMENTS 4,343,993  8/1982  Binnig et al. ........................ 250/306
4,668,865  5/1987  Gimzewski et al. ................ 250/306

OTHER PUBLICATIONS

Hansma et al., Scanning Tunneling Microscopy, Journal of Applied Physics, vol. 61, No. 2, Jan. 15, 1987.
Drake et al., Tunneling Microscope for Operation on Air or Fluids, Rev. Sci. Instrum. 57(3), Mar. 1986.
Germano, A Study of a Two Channel Cylindrical PZT Ceramic Transducer for Use in Stereo Phonograph Cartridges, IRE Transactions on Audio, Jul.-Aug. 1959.
Binnig et al., Rev. Sci. Instrum., 57(8), Aug. 1986, Single Tube Three-Dimensional Scanner for Scanning Tunneling Microscopy.
Binnig et al., Atomic Force Microscope, Physical Review Letters, 3, Mar. 1986.

Primary Examiner—Bruce C. Anderson
Assistant Examiner—Paul A. Guss
Attorney, Agent, or Firm—Poms, Smith, Lande & Rose

[57] ABSTRACT

A high resolution atomic force microscope allows atomic level topographs of conducting and insulating surfaces. The microscope includes a pair of crossed wires mounted on a single piezoelectric tube which not only controls the x-, and y-, positions of the tip as it is scanned across a surface, but which also adjusts the force with which the tip presses against the sample. The amount of the deflection of the wires is detected as a tunneling current between the wires and another electrode.

3 Claims, 2 Drawing Sheets

HIGH RESOLUTION ATOMIC FORCE MICROSCOPE

This invention was made with government support under contract number N00014-78-C-0011 awarded by the Office of Naval Research. The government therefore, has certain rights in this invention.

FIELD OF THE INVENTION

The present invention relates generally to atomic force microscopes and specifically to microscopes that obtain high resolution, if not atomic resolution, topographs of both conducting and insulating surfaces.

BACKGROUND OF THE INVENTION

Atomic force microscopes (AFM) are used to investigate surfaces on an atomic scale. As discussed in "Atomic Force Microscope," by G. Bining, J. C. F. Quate, and C. F. Gerber, as published in *Physical Review Letters*, Vol. 56, No. 9, Mar. 3, 1986, such microscopes operate by having a probe in contact with the surface to be profiled. As the probe is moved and the surface contour changes, the probe is electrically adjusted to keep the force constant. Monitoring the current or voltage applied to the probe to maintain the constant force will provide an accurate indication of the surface contour. Moving the probe in a series of adjacent scans across the surface will allow a three-dimensional contour map to be generated.

The AFM described by Bining, et al. can profile surfaces with forces sufficiently small that the surface is not deformed. Bining, et al. utilize a gold foil lever for holding a diamond tip that is scanned across the surface. A scanning tunnelling microscope (STM) is used to determine the position of the lever in order to allow adjustment of the tip force.

The heart of the AFM as described by Bining, et al. is the arrangement of the lever and diamond tip. That arrangement suffers from two inherent problems. The first is that a number of piezoelectric elements are necessary to move the tip. Second, the STM must be employed to determine the deflection of the lever and thus the force to be applied to the tip. Beyond being a complex arrangement, the STM is subject to lateral sensitivity, which results in topographic artifacts.

Accordingly, it is the principal object of the present invention to improve the performance and sensitivity of an ATM.

It is another object of the present invention to simplify the construction of an ATM.

Yet another object of the present invention is to minimize topographic artifacts in AFM images.

SUMMARY OF THE INVENTION

The present invention, in a broad aspect, is an AFM utilizing a tip mounted on a pair of crossed wires. The wires are mounted on a single piezoelectric tube which controls the x, y, and z positions of the tip. In this manner the position of the tip is controlled as it is scanned across the surface, and the force with which the tip presses on the surface is adjusted. All motion and adjustment in the present invention is done with one piezoelectric tube.

In accordance with the features of the invention, the amount that the tip is moved by the surface is detected by the tunneling current between a wire or filament and another wire, filament, or blade. This new detection scheme has less lateral sensitivity thus helping to minimize artifacts in the topograph.

The profiles taken with the AFM according to the present invention have atomic-level resolution. The AFM can non-destructively measure topographs of semiconductor metal, and even insulating surfaces. These topographs are of importance not only to science, but also for practical applications such as semiconductor device manufacture.

Other objects, features and advantages of the present invention will become apparent from a consideration of the following detailed description and the accompanying drawings.

DETAILED DESCRIPTION

Figure 1:
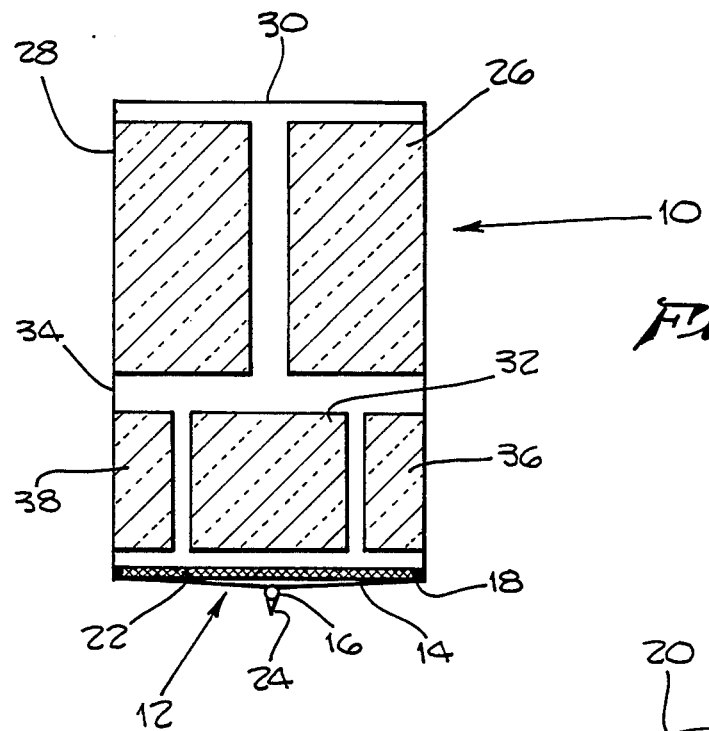
FIG. 1 is a cross sectional view of an AFM according to the present invention.
Figure 2:
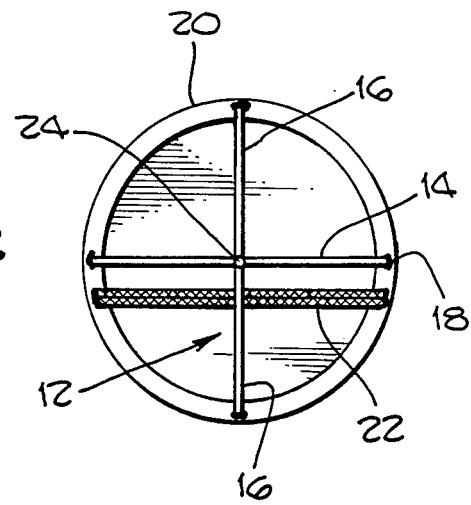
FIG. 2 is a bottom view of the AFM show in FIG. 1.

Referring more particularly to the drawings, the AFM 10 according to the present invention includes, as shown in FIGS. 1 and 2, a spring 12 made of two crossed wires of filiments 14, 16 which are fastened together. The wires or filaments 14, 16 can be made of such materials as gold, carbon fiber, or graphite fiber. (Four separate wires can also be used, connected at one end.) The wires are mounted with adhesive, solder or spot welds 18 onto a piezoelectric tube 20. Also mounted on the tube 20 is a sensing electrode 22.

A sharp point, 24, usually diamond, is mounted where the wires 14, 16 cross. The tube 20 moves the point 24 along the x-, y-, and z-axes. Its operation is described more fully in "Single-tube three-dimensional scanner for scanning tunneling microscopy," G. Bining and D. P. E. Smith, *Review of Scientific Instruments*, Vol. 57, page 1688, August, 1986.

In a prototype of the invention, the wires 14, 16 were 0.05 mm. diameter gold wires. The tube 20 was 1.3 cm. in diameter and the sensing electrode 22 was a platinum-rhodium alloy.

In operation, the sample and AFM are mounted to a support as reflected in the "Atomic Force Microscope" article. The point 24 is moved toward the sample until the atomic force between it and the sample causes the crossed wires 14, 16 to deflect until one conductor 16 comes close enough to the sensing electrode 22 that a tunneling current can flow (within about 10 Å). The movement of the point 24 is done via the z-electrode on the tube 20.

The point 24 is thereafter scanned laterally across the surface by x and y voltages applied to electrodes 26 and 28. The z voltage, applied to electrode 30 to keep the tunneling current between the conductor 16 and the sensing electrode 22, will be a measure of the height of the surface. More precisely, the z for each x, y point will be the height at which the force between the point and the sample is the same. A plot of z versus x, y will be a topograph of the surface.

The force of the point 24 against the same can be adjusted by applying different voltages to electrodes 32, 34, 36 and 38. This will change the distance, $\Delta X$, that the conductor 16 must move to come within a tunneling distance of the sensing electrode 22. The force will be $F = k\Delta X$ where k, the spring constant will be in the range 1–20 N/m. To obtain a spring constant near the bottom of this range requires wires 14, 16 of order 10 μm in diameter for a tube 20 diameter of 2 mm, or of order 0.04 mm in diameter for a tube 20 diameter of 1.3 cm. The resonant frequency for the wires 14, 16 on the smaller tube will be of order 10 kHz (of order 1 kHz on the larger tube). The smaller tube diameter is preferable since a higher resonant frequency means more immunity to external vibrations.

Figure 3:
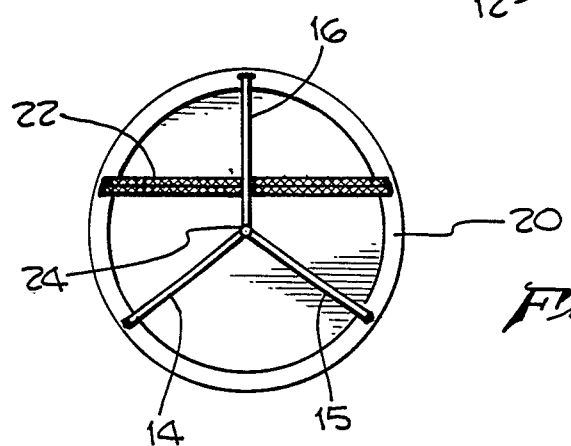
FIG. 3 is a bottom view of the AFM shown in FIG. 1 with the parts in an alternative configuration.

FIG. 3 shows an alternative embodiment for the wires and tip. In FIG. 3, a third wire 15 is added to the other two wires 14 and 16. This configuration is easier to fabricate because of the fewer connection points to the tube 20.

The coarse adjustment of the spacing of the conductor 16 and the sensing electrode 22 can be done by simply bending either one until an ohmmeter between 2 and 5 just shows a short. The electrodes 36, 38, or 32, 34 can then be used to open the short. For example, if a voltage is applied to 36, 38 in the direction of poling relative to an internal grounded electrode 40 (see FIG. 4) then the piezoelectric tube 20 will contract in such a way as to pull the sensing electrode 20 away from the conductor 16. Alternatively, 16 and 22 can be bent until they just open and then electrodes 10, 10' can be used to bring them into contact.

Figure 4:
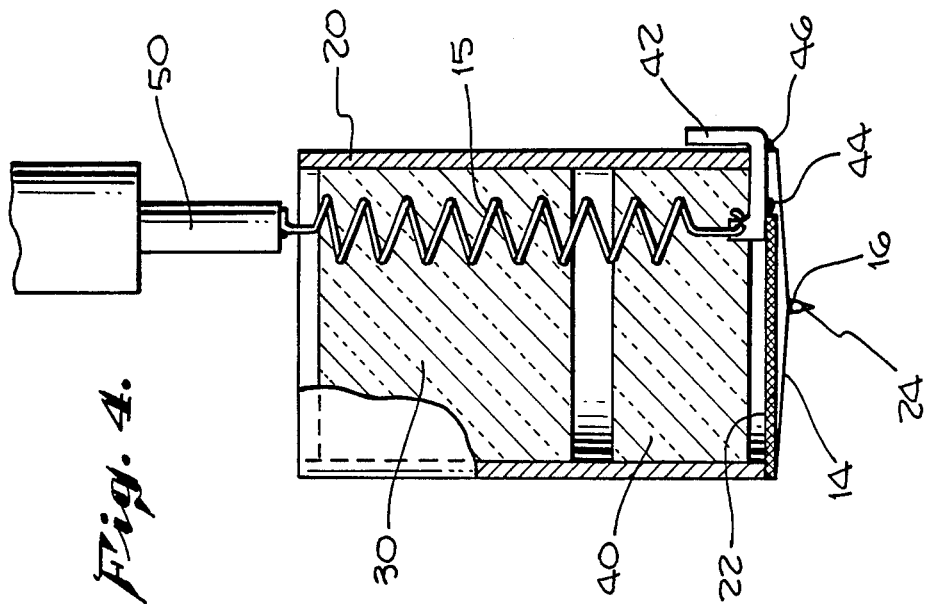
FIG. 4 is a cross sectional view of the AFM of FIG. 1 showing an enhancement thereof.

Although the coarse adjustment can be done by simply bending the wires 14, 16, FIG. 4 shows a mechanism for doing a more controllable coarse adjustment. A bracket 42 is soldered or glued to the side of the tube 20. The sensing electrode 22 is attached to this bracket 42 with a spot weld, solder, or glue at 44. (Wire 14 is attached at 46.) A spring 48, attached top the bracket 42, is stretched by the a nonrotating spindle micrometer 50 (or other linear translation device) to bend the bracket 42 to pull the sensing wire 22 away from the conductor 16. If the spring constant of the spring 48 is 1000 times smaller than that of the bracket 42 then the ratio of motion of the end of the sensing wire 22 to the motion of the linear translation device 50 will be 1/1000. The motion of the center of the sensing wire 22 will be ½ of this. Thus, if the linear translation device can be adjusted to 2 μ then the position of the sensing wire can be adjusted to 2 μ/2000 = 10 Å. This is well within the range of the piezoelectric motion supplied by electrodes 32, 34 or 36, 38.

Figure 5:
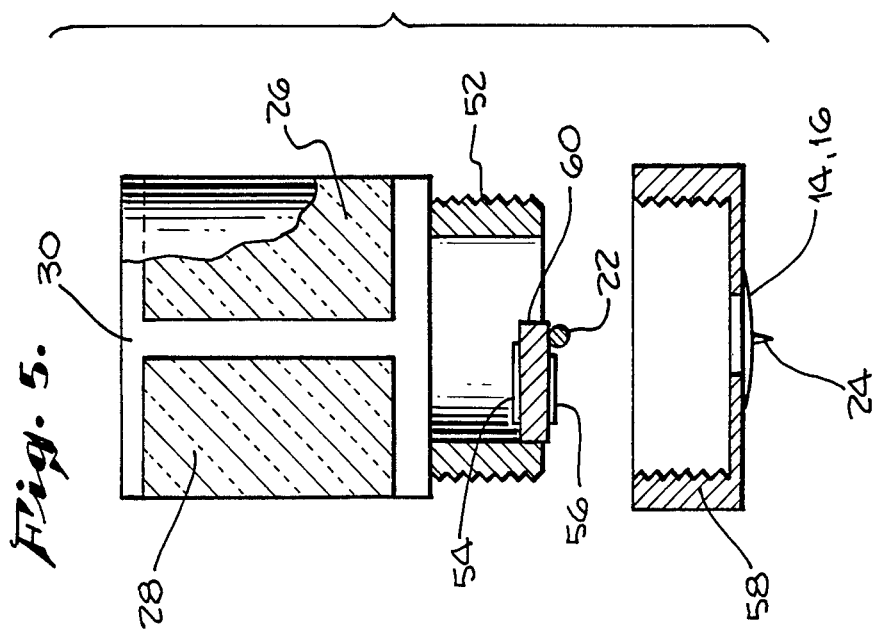
FIG. 5 is an exploded cross sectional view of the AFM of FIG. 1 showing the assembly details.

Calculations of spring constant and resonant frequency of crossed wires 14, 16 show that better performance of the AFM would be obtained for crossed carbon filaments 10 μm in diameter and 3 mm in length. With such delicate components, the question of how to assemble the device, in particular how to bring sense-wire 22 near crossed wires 14, 16 becomes an essential design consideration. FIG. 5 shows an AFM modified to include an assembly system. Corresponding parts of the microscope of FIG. 1 are indicated by corresponding numbers. A male threaded ring 52 is now attached to the scanner with x, y, z electrodes 26, 28, 30. The sense wire 22 is now mounted on a piezoelectric bender 60 which flexes up and down in response to voltage on electrodes 54, 56 to maintain the desired force between the point 24 and the sample. The crossed fibers 14, 16 are attached to a female threaded ring 58. The AFM is assembled by turning the female ring 58 slowly onto the male 52 ring until the sense wire 22 and crossed wires 14, 16 are sufficiently close.

High resolution AFM's as described herein could become a standard item in most semiconductor fabrication facilities as well as being an invaluable research tool for metallurgists, surface scientists, and workers in the field of corrosion, lubrication and catalysis. It could provide information about the positions of the atom on the surface of the material whether the material is a conductor or an insulator. The AFM is potentially much more important than the STM since it will work not only for conductors but also for insulators.

The invention described herein is a significant advance over that described by Bining et al. because: (a) the use of crossed wires to replace the lever described by Bining provide much better performance, specifically much high resonant frequencies for the same force constant; (b) the sensing electrode and wire whose position is sensed have decreased lateral sensitivity themselves so that the lateral features determined by the point will not be confused with artifacts from the sensing arrangement; and (c) all of the necessary motions can be supplied by a single piezoelectric tube thus simplifying constructions of the instrument.

In the foregoing description of the present invention, several embodiments of the invention have been disclosed. It is to be understood that other mechanical and design variations are within the scope of the present invention. Accordingly, the invention is not limited to the particular arrangements which have been illustrated and described herein.

What is claimed is:

1. An atomic force microscope to generate topographs of the surface of a sample, comprising:
    point means for contacting said sample;
    wire means for suspending said point means;
    electrode means, disposed adjacent to said wire means, for allowing a tunnelling current to flow between said wire means and said electrode means as said point coarsely adjusting including, in association with said tube means a boss, piezoelectric bending means, mounted to said boss, for moveably supporting said electrode means, and a coupling threadingly engaging said boss and supporting said wire means.

2. An atomic force microscope as defined in claim 1, wherein said adjustment means further comprises bracket means, attached to said spring means and said wire means, for coupling said spring means to said wire means.

3. An atomic force microscope as defined in claim 2, wherein said piezoelectric tube further includes:
    a boss;
    piezoelectric bending means, mounted to said boss, for movably supporting said electrode means; and
    a coupling threadingly engaging said boss and supporting said wire means.

* * * * *

UNITED STATES PATENT AND TRADEMARK OFFICE
CERTIFICATE OF CORRECTION

PATENT NO. : 4,800,274

DATED : January 24, 1989

INVENTOR(S) : Hansma, et al.

It is certified that error appears in the above-identified patent and that said Letters Patent is hereby corrected as shown below:

1. An atomic force microscope to generate topographs of the surface of a sample, comprising:
   point means for contacting said sample;
   wire means for suspending said point means;
   electrode means, disposed adjacent to said wire means, for allowing a tunnelling current to flow between said wire means and said electrode means as said point is moved across said surface, said current reflecting said topographs;
   piezoelectric tube means, attached to said wire means and said electrode means, for moving said point means across said sample and for adjusting the force of said point means across such sample; and
   adjustment means for adjusting the location of said point means, said adjustment means including spring means coupled to said wire means and linear translation means, attached to said spring means, for moving said wire means by biasing said spring means.

3. An atomic force microscope to generate topographs of the surface of a sample, comprising:
   point means for contacting said sample;
   means for coarsely adjusting the location of said point means;
   wire means for suspending said point means;
   electrode means, disposed adjacent said wire means, for allowing a tunnelling current to flow between said wire means and said electrode means as said point is moved across said surface, said current reflecting said topographs;
   piezoelectric tube means, attached to said wire means and said electrode means, for moving said point means across said sample and for adjusting the force of said point means against said sample, said means for coarsely adjusting including, in association with said tube means a boss, piezoelectric bending means, mounted to said boss, for moveably supporting

UNITED STATES PATENT AND TRADEMARK OFFICE
CERTIFICATE OF CORRECTION

PATENT NO. : 4,800,274

DATED : January 24, 1989

INVENTOR(S) : Hansma, et al

Page 2 of 2

It is certified that error appears in the above-identified patent and that said Letters Patent is hereby corrected as shown below:

said electrode means, and a coupling threadingly engaging said boss and supporting said wire means.

Signed and Sealed this

Tenth Day of October, 1989

Attest:

DONALD J. QUIGG

Attesting Officer

Commissioner of Patents and Trademarks